United States Patent
Blaauw et al.

(10) Patent No.: US 8,407,025 B2
(45) Date of Patent: Mar. 26, 2013

(54) OPERATING PARAMETER CONTROL OF AN APPARATUS FOR PROCESSING DATA

(75) Inventors: David Theodore Blaauw, Ann Arbor, MI (US); Dennis Michael Sylvester, Ann Arbor, MI (US); David Alan Fick, Ann Arbor, MI (US); Stuart David Biles, Suffolk (GB); Michael John Wieckowski, Ann Arbor, MI (US); Scott McLean Hanson, Farmington Hills, MI (US); Gregory Kengho Chen, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 710 days.

(21) Appl. No.: 12/379,617

(22) Filed: Feb. 25, 2009

(65) Prior Publication Data

US 2010/0217562 A1    Aug. 26, 2010

(51) Int. Cl.
*G06F 17/18* (2006.01)
*G06F 17/50* (2006.01)
*G01R 31/30* (2006.01)

(52) U.S. Cl. .................. 702/179; 714/745; 716/113
(58) Field of Classification Search .................. 702/179, 702/57–60, 64–66, 69–71, 75, 78–79, 81, 702/84, 127, 130, 136, 155, 167, 182–183, 702/185–186, 189; 716/100–101, 106, 108, 716/113, 132–134, 136; 714/48, 699–700, 714/707, 724, 731, 744–745, 798–799, 814; 700/28–33, 95, 108–110

See application file for complete search history.

(56) References Cited

U.S. PATENT DOCUMENTS 5,608,645 A * 3/1997 Spyrou .......................... 716/113
7,162,661 B2 * 1/2007 Mudge et al. ................... 714/10

OTHER PUBLICATIONS

Gu-Yeon Wei, Energy-Efficient I/O Interface Design with Adaptive Power-Supply Regulation, Jun. 2001, Ph. D. Dissertation, Electrical Engineering Depart., Stanford University, 132 pp.*

* cited by examiner

*Primary Examiner* — Toan Le
(74) *Attorney, Agent, or Firm* — Nixon & Vanderhye P.C.

(57) ABSTRACT

An apparatus for processing data 2 is provided with a time-to-digital converter 18 which serves to measure signal processing delay through one or more signal paths through a processing stage. This measured delay generates a delay value representing a plurality of instances of the signal processing delay which have been measured. Analysis is performed under software control to estimate a worst case signal processing delay through the processing stage based upon the delay values which have been generated. An adjustment of the operating parameters, such as supply voltage and clock frequency, of the apparatus is made to provide a timing margin through the processing stage sufficient to satisfy the worst case signal processing delay which has been estimated without an excessive margin.

21 Claims, 4 Drawing Sheets

OPERATING PARAMETER CONTROL OF AN APPARATUS FOR PROCESSING DATA

BACKGROUND OF THE INVENTION

1. Field of the Invention

This invention relates to the field of data processing systems. More particularly, this invention relates to the control of operating parameters of data processing systems, such as, for example, control of the operating voltage or operating frequency.

2. Description of the Prior Art

It is known to provide apparatus for processing data which incorporates mechanisms for controlling the operating parameters of that data processing system. As an example, it is known from International Published Patent Application WO-A-2004/084072 to provide mechanisms which adjust the operating parameters of a data processing system so as to reduce the operating margins for the purpose of increasing performance and/or efficiency. In the above mentioned example, the operating margins are decreased to the point where a finite non-zero error rate is maintained. When errors occur these are detected and repaired.

Whilst the above described mechanism for operating parameter control reduces the excessive operating margins normally provided within data processing systems, it suffers from the disadvantage of significantly increasing design and testing complexity of the apparatus. Techniques which can reduce excessive operating margins without unduly increasing complexity are advantageous.

SUMMARY OF THE INVENTION

Viewed from one aspect the present invention provides a method of controlling one or more operating parameters of an apparatus for processing data, said method comprising the steps of:

performing data processing with at least one processing stage of said apparatus;

measuring, over a period of operation of said apparatus, a plurality of instances of a signal processing delay of at least one signal path through said processing stage;

generating delay values representing said plurality of instances of said signal processing delay;

analysing said delay values to estimate a worst case signal processing delay through said processing stage; and adjusting said one or more operating parameters to provide a timing margin through said processing stage sufficient to satisfy said worst case signal processing delay.

The present invention provides a technique whereby signal processing delays are measured over a period of operation such that a large number of instances of an individual signal processing delay are measured. Delay values representing these instances of the signal processing delay being measured are generated. The generated delay values are then analysed to estimate a worse case signal processing delay through the processing stage in which the signal processing delay is measured. One or more operating parameters are then adjusted to provide a timing margin through the processing stage sufficient to satisfy the measured worse case signal processing delay. Measuring over a period of operation of the apparatus enables a statistically reliable estimation of the worse case signal processing delay for the individual apparatus to be found. This in turn permits adjusting of the operating parameters to achieve a reduced timing margin which is nevertheless sufficient to satisfy the real worse case signal processing delay for the individual apparatus concerned. Thus, excessive margins can be avoided and the operating parameters are tuned to the individual apparatus concerned, which will likely be subject to individual process variations and variations dependent upon environmental conditions.

While it would be appreciated that if the worse case critical path through the processing stage was reliably known in advance, then it might be possible to only measure this known worse case critical path. However, it is more reliable to measure a plurality of different signal paths and generate a plurality of sets of delay values in order to account for individual apparatus variation and other parameters which may influence which signal path is actually the worse case delay signal path for a particular apparatus or at a particular time.

When a plurality of sets of delay values have been generated as above, the step of analysing may serve to analyse this plurality of sets of data values in order to estimate the worse case signal processing delay through the processing stage based upon what may be a plurality of potential critical paths corresponding to the worst case signal processing delay.

Various techniques of analysing the statistical delay value data generated may be used. The statistical delay value data is generated by measuring over a period of operation of the apparatus a plurality of instances of the signal processing delay through each signal path being subject to monitoring. Thus, a reliable measure may be obtained of the maximum likely signal processing delay for a given signal path.

One analysis technique may be based upon identifying a maximum generated delay value for a signal path being monitored and then identifying when a change in this maximum generated delay value is less than a predetermined amount in a predetermined time interval. The change in the maximum delay value within a given time falling below a threshold value indicates asymptotic behaviour of the generated maximum delay value; this corresponds to a reliable maximum generated delay value that can safely be used to determine appropriate levels of reduced operating parameter margin.

This asymptotic analysis can be used in respect of embodiments in which only a single delay path is monitored or for embodiments in which a plurality of delay paths through a processing stage are monitored with the maximum generated delay value over any of these delay paths is recorded and the asymptotic characteristic of such a maximum generated delay value detected and utilised as above.

Another form of analysis which may be employed is to correlate generated delay values with a predetermined expected statistical distribution for the delay values. Once such a correlation has been established between the real world behaviour of the apparatus concerned and the expected statistical distribution for the delay values being monitored, then a reliable estimated statistical distribution of the generated data values for the apparatus being measured may be derived and a worse case signal delay based upon this estimated statistical distribution may be generated. Thus, the actual worse case signal delay may not have been observed but the statistical distribution which was predetermined may be modified on the basis of the observed behaviour of the actual apparatus concerned and this estimated statistical distribution used to derive what would be a likely worse case signal delay.

This correlation technique with predetermined expected statistical distributions may be performed in respective embodiments in which a plurality of sets of delay values are generated each having an estimated statistical distribution from which a worse case signal delay based upon all of these estimated statistical distributions may be generated.

As well as correlating expected and real behaviour for an individual signal path as part of the analysis as described above, it is also possible to perform analysis in which a correlation is performed between expected statistical distributions for a set of delay values against a measured set of delay values in order to generate an estimated statistical distribution for the set of delay values from which a worse case signal delay may be inferred.

It will be appreciated that environmental parameters of the apparatus may influence the signal processing delays that are measured. In order to account for this variation the measuring step and the analysing step may identify any correlation between the one or more environmental parameters and the delay values with the estimate of the worst case signal delay being dependent upon currently detected values of the one or more environmental parameters.

It will be appreciated that the environmental parameters could take a variety of different forms, such as a temperature of the apparatus, an operating voltage of the apparatus and an operating mode of the apparatus.

The one or more operating parameters which are adjusted in accordance with the control techniques described above can take a variety of forms. Typical operating parameters which may be usefully adjusted include an operating voltage of the apparatus, a clock frequency of the apparatus, a clock skew used for a clock signal of the processing stage and a body bias voltage.

In order to efficiently carry out the controls described above some embodiments utilise time-to-digital converter circuitry in order to perform the steps of measuring and generating discussed above.

The operating parameters which are to be controlled may be initialised with starting values having a default margin above values estimated as sufficient to meet an estimated worse case signal processing delay through said processing stage. Such safe default margins may subsequently be reduced when real operating experience of the individual apparatus is obtained through measurement.

It will be appreciated that the above control technique may be performed upon only a single processing stage within an apparatus for processing data. It may be that within such an apparatus the known performance limiting critical path is always within a particular processing stage. However, it is more usual that the critical path could occur in any other number of different processing stages depending upon individual device variation and environmental conditions. Accordingly, in some embodiments the steps of performing, measuring, generating and analysing are performed in respect of each of a plurality of processing stages and the step of adjusting is performed to satisfy the worst case signal processing delay through any of these plurality of processing stages.

The processing stages typically have a plurality of input signals forming an input vector to the processing stage. The critical path may be input vector dependent and accordingly the steps of measuring, generating and analysing may differentiate between different input vector values in order to identify any correlation between the input vector values and the delay values.

Efficient embodiments of the present technique may utilise hardware circuits in order to perform at least the steps of measuring and generating. The delay values which are generated may be stored in a memory and given the complexity of the analysis which may be performed this may conveniently be achieved, at least partially, by software which reads the delay values from the memory and then performs the required analysis.

Viewed from another aspect the present invention provides apparatus for processing data, said apparatus comprising:

at least one processing stage configured to perform data processing;

measuring circuitry coupled to said at least one processing stage and responsive to signal values output from said at least one processing stage over a period of operation of said apparatus to measure a plurality of instances of a signal processing delay of at least one signal path through said processing stage;

generating circuitry coupled to said measuring circuitry and responsive to said plurality of instances of said signal processing to generate delay values representing said plurality of instances of said signal processing delay;

analysing circuitry responsive to said delay values to estimate a worst case signal processing delay through said processing stage; and adjusting circuitry responsive to said worst case signal processing delay to adjust said one or more operating parameters to provide a timing margin through said processing stage sufficient to satisfy said worst case signal processing delay.

Viewed from a further aspect the present invention provides apparatus for processing data, said apparatus comprising:

at least one processing stage means for performing data processing;

measuring means coupled to said at least one processing stage and responsive to signal values output from said at least one processing stage over a period of operation of said apparatus for measuring a plurality of instances of a signal processing delay of at least one signal path through said processing stage;

generating circuitry coupled to said measuring circuitry and responsive to said plurality of instances of said signal processing for generating delay values representing said plurality of instances of said signal processing delay;

analysing circuitry responsive to said delay values for estimating a worst case signal processing delay through said processing stage; and adjusting circuitry responsive to said worst case signal processing delay for adjusting said one or more operating parameters to provide a timing margin through said processing stage sufficient to satisfy said worst case signal processing delay.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
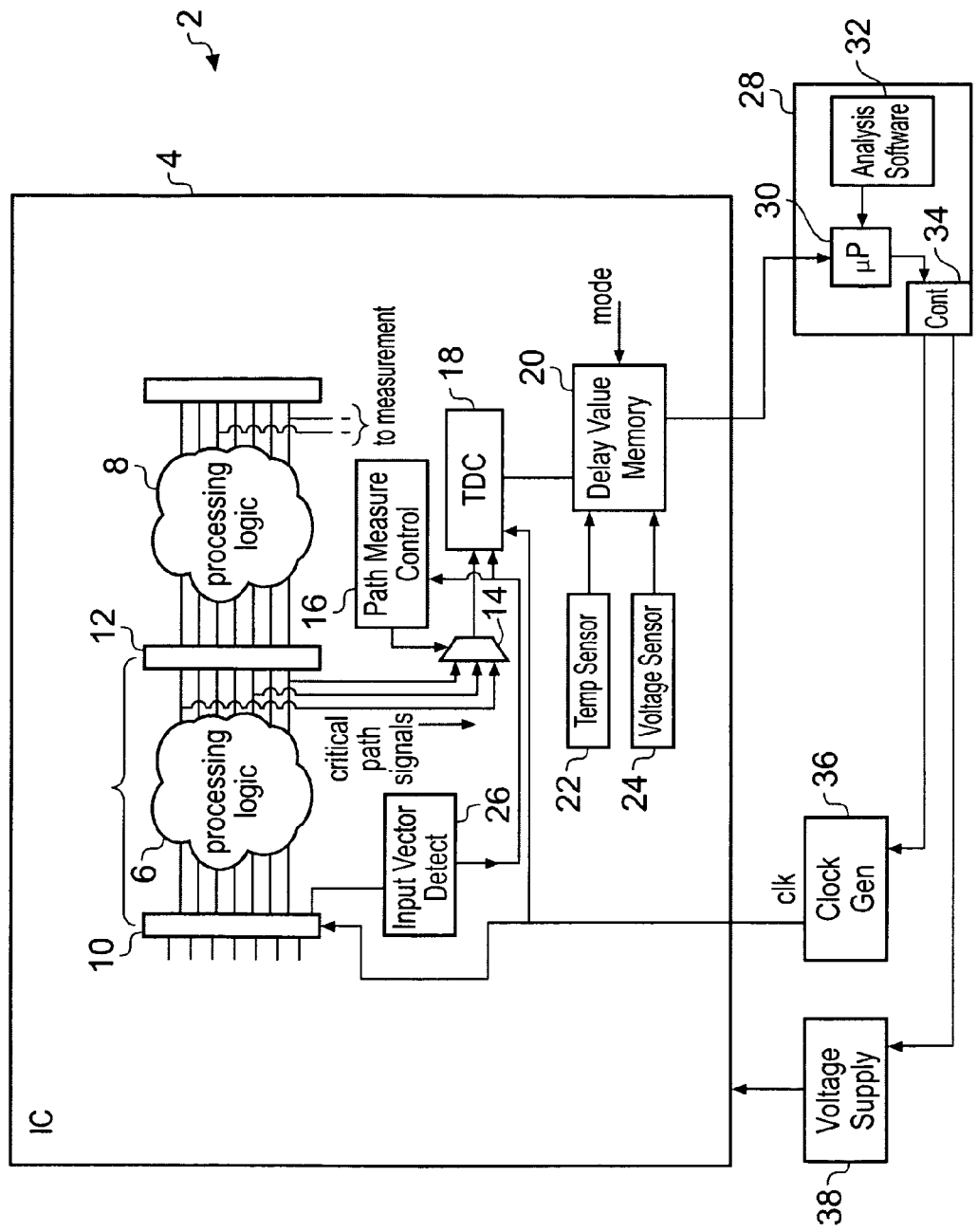
FIG. 1 schematically illustrates an apparatus for processing data including mechanisms for controlling operating margin in dependence upon measured behaviour.

FIG. 1 schematically illustrates an apparatus for processing data 2 in the form of an integrated circuit 4. This integrated circuit 4 includes a plurality of processing stages. These processing stages comprise processing logic 6, 8 which receives a set of input signal values from registers 10, 12 and generate output signal values to be passed to the next processing stage. The techniques may also be applied to a plurality of processing stages monitored and controlled as if they were a single stage. The segmentation in to stages can be varied and a processing stage need not be restricted to one set of logic between registers. This type of processing logic will be familiar to those in this technical field and is illustrated in stylised form in FIG. 1. An important characteristic of such processing stages is the worst case signal processing delay through the processing stage. This worst case signal processing delay typically controls the operating parameters which may be used, such as the clock frequency and the operating voltage. If the worst case signal path delay is insufficient to meet the timing requirements (i.e. an output signal will not be properly generated in time for it to be captured by the inputs of the next processing stage), then the operating parameters will need to be adjusted to provide an appropriate margin above the minimum requirements. Normal engineering practice is to design such integrated circuits with a large (e.g. 30%) operating margin to ensure that the timing requirements of the critical path are always met despite any individual manufacturing variation or variation due to environmental parameters.

Figure 2:
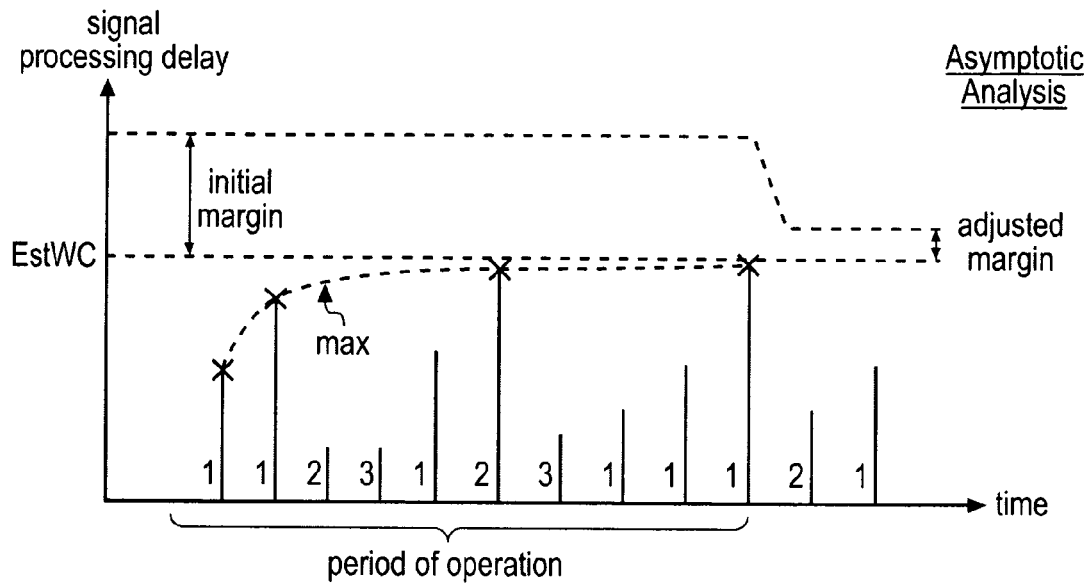
FIG. 2 schematically illustrates asymptotic analysis performed in respect of generated delay values to identify a time at which the operating margin may be reduced and the amount by which that operating margin may be reduced.

In the system illustrated in FIG. 2 several (but not all) of the output signals from the processing logic are supplied to a multiplexer 14. The output signals selected are those which potentially correspond to the critical path having the worst case signal processing delay through the processing logic 6. These output signals are monitored in sequence under control of a path measurement controller 16 which selects an output signal to be monitored and supplies it to a time-to-digital converter 18 where it is referenced against the clock signal initiating the start of the propagation of the signal through the processing logic 6. In this way a measurement may be made of the signal processing delay of the currently selected signal path through the processing logic and this may be converted into a digital delay value. This delay value generated by the time-to-digital converter 18 is supplied to a delay value memory 20 where it is compared with the currently stored maximum delay value which has previously been observed for that signal path. If the current delay value exceeds the previously observed maximum delay value for that signal path, then the new maximum delay value for that signal path stored within the delay value memory 20. Different maximum delay values for a given signal path are stored for different environmental parameter conditions. A temperature sensor 22, a voltage sensor 24 and a mode signal are fed to the delayed value memory 20 and used to select an appropriate maximum delay value to be compared against the currently generated delay value in determining whether or not a new maximum has been achieved for the currently experienced environmental conditions.

The time-to-digital converter 18 and the delay value memory 20 are provided in hardware so as to provide efficient high speed ongoing measurement and delay value generation over an extended period of operation of the integrated circuit 4 (e.g. billions of processing cycles). Thus real measured behaviour of the signal paths predetermined as potentially corresponding to the critical paths having the worst case signal processing delay may be observed. It may be that worst case signal processing delay is dependent upon the input vector to the processing logic 6. Such data dependencies will be familiar to those in this technical field. In order to accommodate this factor, an input vector detector 26 determines when input vectors known to be likely to generate worst case signal processing delays occur and accordingly switch the relevant signal paths to be monitored and indicates which input vector has occurred. The use of the input vector detector in this way is optional.

The input vectors to the processing stage may be random (e.g. those occurring naturally during normal operation) or may be stored/generated for occasional use. It may be beneficial to run one or more sequences of known/repeatable input vectors and analyse their distribution. These sequences of known vectors might be chosen specifically and stored in memory, or generated using a pattern generator (e.g. linear feedback shift register).

The hardware on the integrated circuit 4 illustrated in FIG. 1 performs the measurement and generating steps associated with the present technique. In this example embodiment the steps of analysing the generated data values are performed under software control by a separate processor 28 which includes a microprocessor core 30 and analysis software 32. The analysis of the generated data value may in other embodiments be performed by a processor on the integrated circuit 4 which is being monitored. The microprocessor core 30 under control of the analysis software 32 reads the maximum delay values identified by the hardware within the integrated circuit 4 from the delay value memory 20 and then perform analysis thereupon as will be described below in order to estimate a worst case signal processing delay for the processing stage being monitored. When a sufficiently reliable estimate of the worst case signal processing delay has been generated, control circuitry 34 adjusts the operation of a clock signal generator 36 and/or a voltage supply 38 to change the operating parameters of the integrated circuit 4. The operating parameters so adjusted have a reduced margin compared to the minimum required to meet the timing requirements of the processing stage. These reduced margins are exploited to reduce the voltage supply to a lower value thereby saving power or to increase the clock frequency to a higher value thereby increasing performance. Other operating parameters may be controlled and adjusted in different ways depending upon the design priorities of the apparatus for data processing 2.

The control circuitry 34 may also adjust other parameters such as body bias voltage and/or clock skew. Adjusting clock skew may affect more than one processing stage, e.g. using skew to move excess timing margin from one stage to another.

The different processing stages within the apparatus for processing data may be monitored and adjusted independently, e.g. each processing stage may have its own operating voltage.

FIG. 2 schematically illustrates asymptotic analysis of a form which may be performed by the analysis software 32. In this example the signal processing delays for a set of signal paths (identified by the numbers 1, 2, 3 next to the individual delay values illustrated) are measured by the time-to-digital converter 18. The maximum delay value identified is stored within the delay value memory 20. Over a period of operation this maximum observed delay value gradually increases as a statistically more valid sample of instances of the signal processing delays is measured. The maximum delay value will generally show asymptotic behaviour whereby it converges to a reliable maximum value which can be identified by detecting when the change in the maximum delay value over a predetermined period is below a threshold value. When such asymptotic behaviour is identified, the analysis software can trigger an adjustment in the margin of the operating parameters to a reduced level calculated to be sufficient to still permit the estimated worst case (EstWC) signal processing delay through the processing stage to be accommodated.

Figure 3:
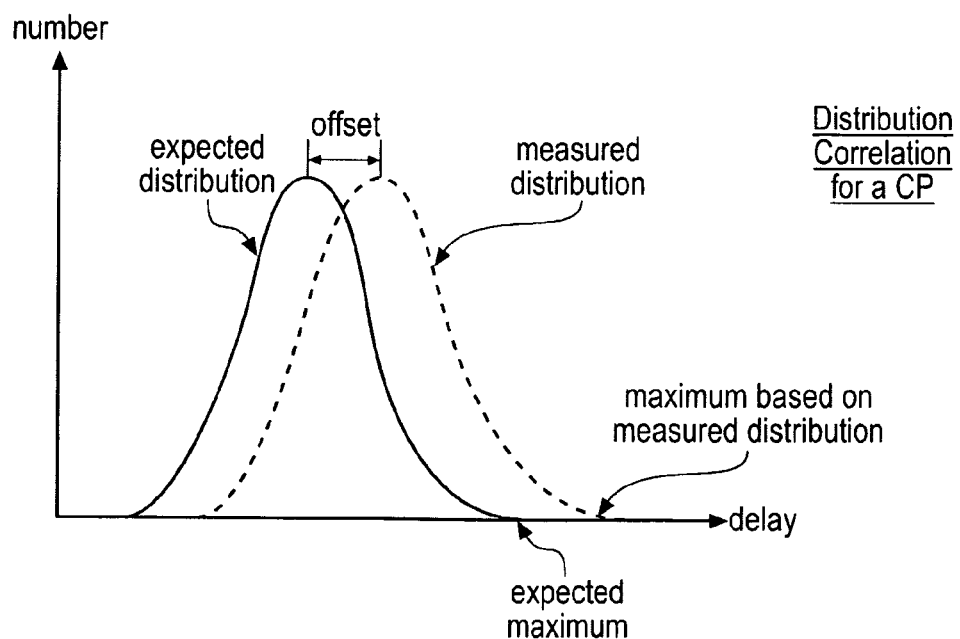
FIG. 3 schematically illustrates a technique for correlating distributions of delay values for a critical path.

FIG. 3 illustrates an analysis which may be performed by the analysis software 32 in order to correlate a measured distribution of delayed values for a given critical path with an expected distribution for those delayed values. The expected distribution may be calculated in advance through simulation of the processing stage or through measurement of other instances of the apparatus concerned. The measured distribution of delay values which may be recorded within the delay value memory 20 can then be compared with the expected distribution. When a reliable correlation has been identified, an offset between the expected distribution and the measured distribution may be derived and this offset used to determine a maximum delay value for the apparatus concerned based upon an expected maximum from the expected distribution to which the offset between the correlated distributions has been applied. In this example it will be seen that the measured distribution of delays is higher than the expected distribution of delays and accordingly the maximum delay value needs to be higher than the expected maximum. It will be appreciated that the expected maximum delay value may not have been observed in the measurements of the apparatus 2 but may be reliably identified by an appropriate correlation between the expected distribution with its expected maximum value and the measured distribution of delay values which have been observed/recorded.

Figure 4:
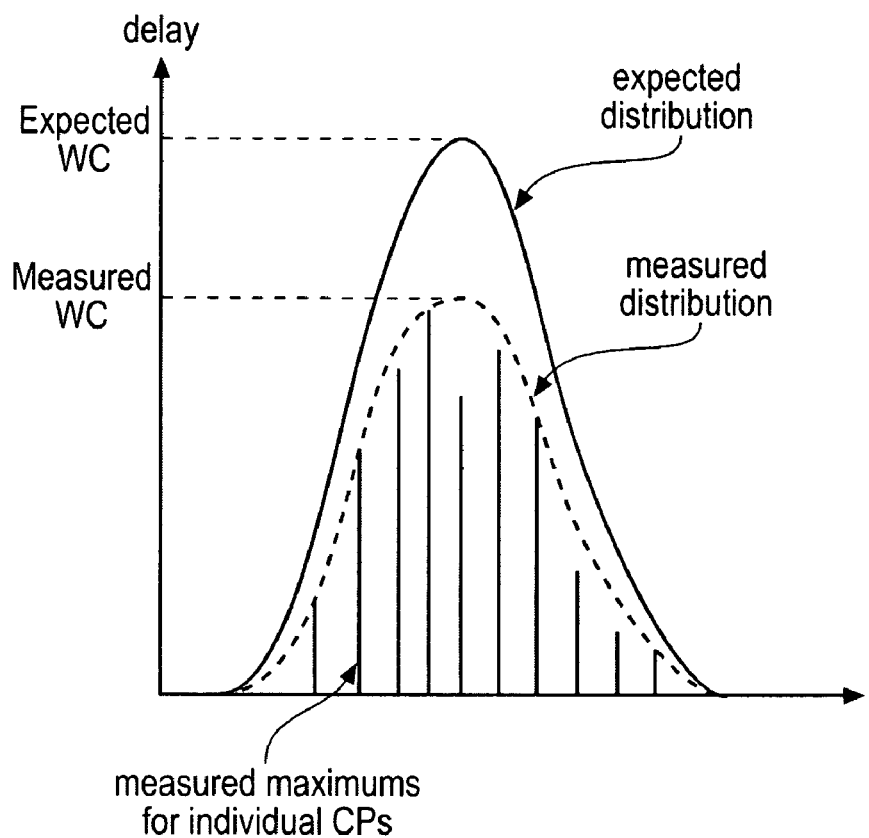
FIG. 4 schematically illustrates a technique whereby a set of measured maximums for individual critical paths are correlated with expected behaviour in order to produce an estimate of a worse case critical path.

FIG. 4 illustrates another analysis technique based upon correlation. In this technique a set of individual critical paths for which the maximum delay values have been determined is analysed and its distribution identified. This distribution is compared with an expected distribution for the set of maximums. This expected distribution may be derived by simulation or measurement of one or more other apparatuses for data processing having the same form as the apparatus currently being measured and controlled. When the correlation between the set of measured maximums and the expected set of maximums has been identified, an offset between the expected worse case delay and the measured worse case delay can be determined. In this case the measured worse case delay is estimated as less than the expected worse case delay. The measured worse case delay may not have been observed but nevertheless may be reliably identified by virtue of the correlation achieved between the measured maximums which have actually been observed and the expected distribution of those maximum delay values across the set of critical paths being observed.

Figure 5:
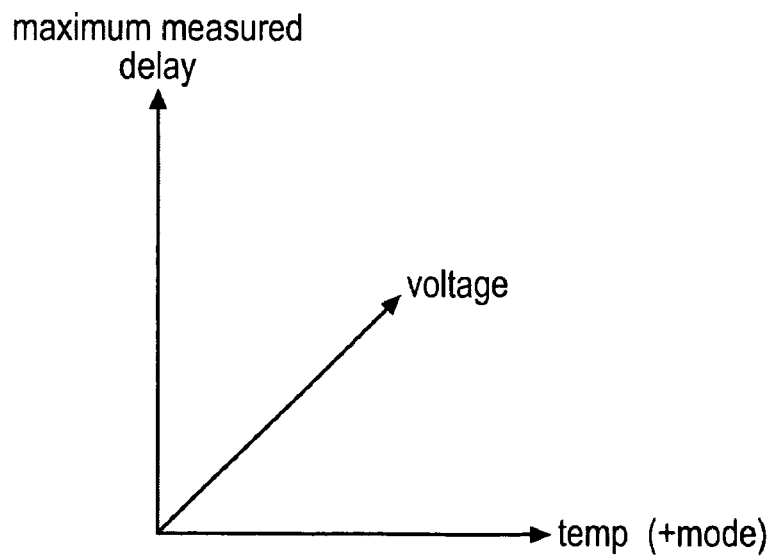
FIG. 5 schematically illustrates how a maximum measured delay may be correlated with environmental parameters such that an estimated worst case signal path delay for a given set of environmental parameters may be derived.

FIG. 5 schematically illustrates how maximum measured delay values may be recorded in respect of different values of environmental parameters such as operating voltage, operating temperature and operating mode. Different maximum measured delay valued are recorded for different ranges of these environmental parameters. This permits the maximum measured delay value being used to control the operating parameters of the apparatus 4 to be adjusted in dependence upon the environmental parameters encountered at that time. The operating parameters appropriate to give a small safety margin when the apparatus 2 is operating in a cool environment may be insufficient when the apparatus 2 is in a hot environment close to the operating temperature limits of the apparatus 2. The separate recording of maximum measured delay values facilitated by use of the temperature sensor 22 and the voltage sensor 24 of FIG. 1 together with the recording of the values in N-dimensional environmental parameters space as schematically illustrated in FIG. 5 permits such different environmental conditions to be factored into the operating parameter control.

Figure 6:
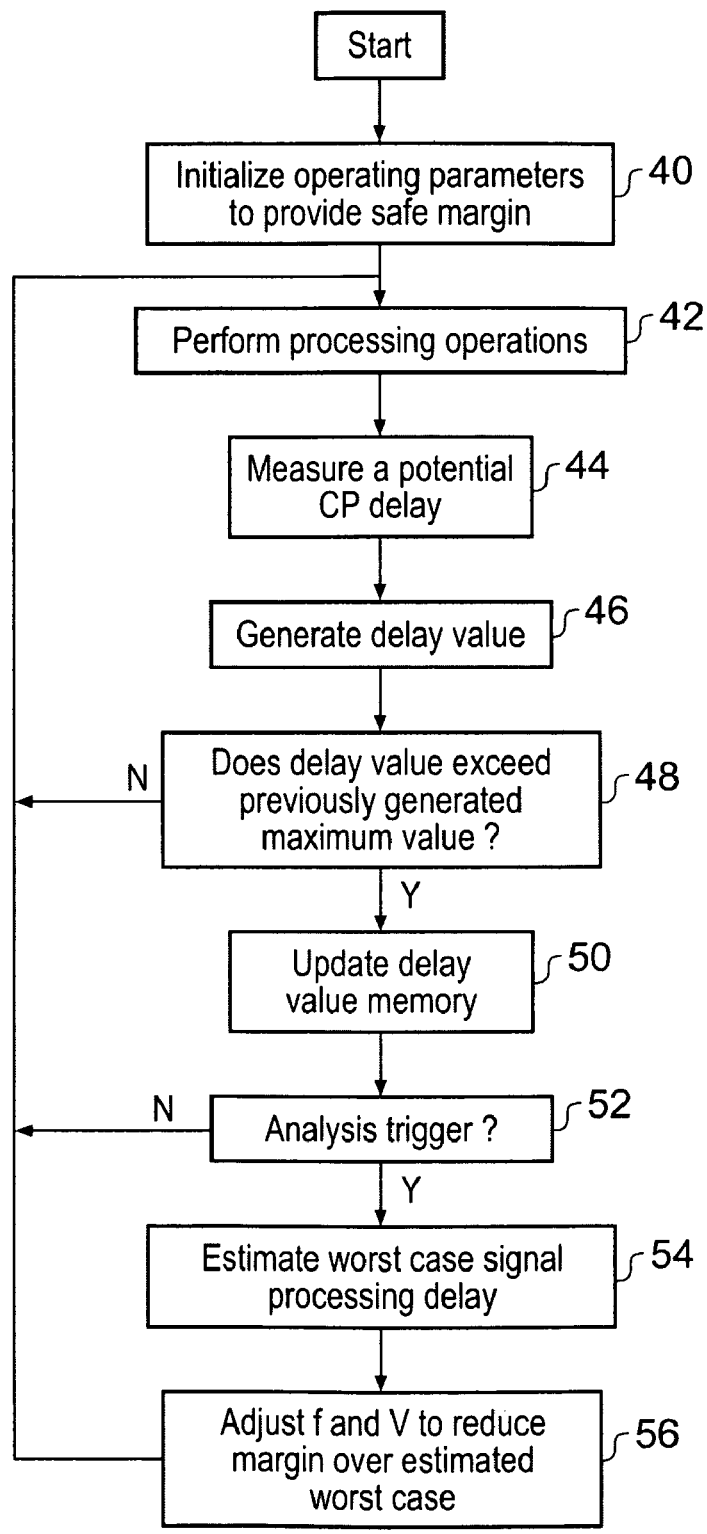
FIG. 6 is a flow diagram schematically illustrating the operation of the control process of one example of the present technique.

FIG. 6 is a flow diagram schematically illustrating the control in accordance with the present technique. At step 40 the operating parameters for the apparatus 2 are initialised in order to provide a safe margin for meeting the timing requirements. At step 42 processing operations are performed including processing operations in which signals propagate through a processing stage being monitored. At step 44 measurement is made of a potential critical path delay associated with a signal processing delay through the processing stage being monitored. Step 46 generates a delay value from this measured critical path delay. Step 48 determines whether or not this delay value exceeds a previously generated maximum value for that signal path which was measured at step 44. If this delay value does not exceed the previously generated maximum delay value for that signal path, then processing returns to step 42. It will be seen that by repeatedly passing through the steps 42, 44, 46, 48 processing operation over a period of time may be monitored in order to generate statistically valid values for the maximum delay value associated with a set of signal paths through a processing stage.

If the determination at step 48 was that the newly measured delay value exceeded the previously measured maximum value for that signal path, then step 50 serves to update the delay value memory 20 to record the new maximum value. Step 52 then determines whether or not an analysis of the delay values which have been stored is to be triggered. Such an analysis might be triggered every time a new maximum is recorded. Other possibilities would be to perform analysis at predetermined intervals, such as determined by a watchdog timer, or in response to an accumulative number of updates to the values within the delay value memory 20 having been made. If an analysis is not to be triggered, then processing returns to step 42. If an analysis is triggered, then step 54 serves to estimate a worst case signal processing delay for the processing stage being monitored based upon the delay values stored within the delay value memory 20. Step 56 then adjusts the operating parameters, such as clock frequency and/or operating voltage, so as to reduce the margin of the available timing window over the estimated worst case signal processing delay. Processing then returns to step 42.

It will be appreciated that the analysis performed in step 54 can take a variety of different forms, such as those discussed in relation to FIGS. 2, 3, 4 and 5. Other forms of analysis are also possible. This analysis is based upon measured signal processing delays through a processing stage being monitored with these signal processing delays being measured over a plurality of instances of the signal processing delay so as to establish a statistically valid indication of the maximum signal processing delay likely. In this way, the operating parameter control to reduce the timing margin can be adapted to the individual apparatus including any manufacturing variation of that apparatus as well as the environmental parameters of that apparatus. The reduced operating margin can improve performance, such as permitting a lower supply voltage to be used or permitting a higher clock frequency to be used.

The above described example has focused on the recording and analysis of maximum delay values. However, the present techniques can also be used to record and analyse other values, e.g. values within a certain range of the maximum and/or all values. Such alternatives may be useful, for example, in the statistical analysis of the delay of individual paths.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling one or more operating parameters of an apparatus for processing data, said method comprising the steps of:
performing data processing with at least one processing stage of said apparatus;
measuring, over a period of operation of said apparatus, a plurality of instances of a signal processing delay of at least one signal path through said processing stage;
generating delay values representing said plurality of instances of said signal processing delay;
analysing said delay values to estimate a worst case signal processing delay through said processing stage; and
adjusting said one or more operating parameters to provide a timing margin through said processing stage sufficient to satisfy said worst case signal processing delay.

2. A method as claimed in claim 1, wherein
said step of measuring measures signal processing delays of a plurality of different signal paths through said processing stage; and
said step of generating generates a plurality of sets of delay values, each set of delay values representing said plurality of instances of said signal processing delay through an associated signal path of said plurality of different signal paths.

3. A method as claimed in claim 2, wherein said step of analysing analyses said plurality of sets of delay values to estimate said worst case signal processing delay through said processing stage.

4. A method as claimed in claim 3, wherein said step of analysing comprises identifying when a change in a maximum generated delay value is less than a predetermined amount during a predetermined time interval for each of at least a predetermined number of said sets of delay values and then using said maximum generated delay values to estimate said worst case signal processing delay.

5. A method as claimed in claim 3, wherein said step of analysing comprises for each set of delay values correlating said generated delay values with a predetermined expected statistical distribution for said delay values and estimating said worst case signal delay based upon estimated statistical distributions for said sets of generated delay values.

6. A method as claimed in claim 3, wherein said step of analysing comprises correlating said generated sets of delay values with a predetermined expected statistical distribution for said sets of delay values and estimating said worst case signal delay based upon an estimated statistical distribution for said sets of generated delay values.

7. A method as claimed in claim 2, wherein said plurality of different paths are a predetermined group of paths identified as potential critical paths corresponding to said worst case signal processing delay.

8. A method as claimed in claim 1, wherein said step of analysing comprises identifying when a change in a maximum generated delay value is less than a predetermined amount during a predetermined time interval and then using said maximum generated delay value to estimate said worst case signal processing delay.

9. A method as claimed in claim 1, wherein said step of analysing comprises correlating said generated delay values with a predetermined expected statistical distribution for said delay values and estimating said worst case signal delay based upon an estimated statistical distribution for said generated delay values.

10. A method as claimed in claim 1, further comprising detecting one or more environmental parameters of said apparatus when said signal processing delay is measured and said step of analysing identifies any correlation between one or more environmental parameters and said delay values and estimates said worst case signal delay in dependence upon currently detected values of said one or more environmental parameters.

11. A method as claimed in claim 10, wherein said one or more environmental parameters include one or more of:
a temperature of said apparatus;
an operating voltage of said apparatus; and
an operating mode of said apparatus.

12. A method as claimed in claim 1, wherein said one or more operating parameters include one or more of:
an operative voltage of said apparatus;
a clock frequency of said apparatus;
a clock skew of a clock signal; and
a body bias voltage of said apparatus.

13. A method as claimed in claim 1, wherein said steps of measuring and generating are performed by time-to-digital converter circuitry.

14. A method as claimed in claim 1, wherein said one or more operating parameters are initialized with starting values having a default margin above values estimated as sufficient to meet an estimated worst case signal processing delay through said processing stage.

15. A method as claimed in claim 14, wherein, during operation of said apparatus, said step of adjusting reduces a margin of said values of said one or more operating parameters above an estimated minimum required to meet said worst case signal processing delay based upon measured behaviour of said apparatus.

16. A method as claimed in claim 1, wherein said apparatus comprises a plurality of processing stages and said steps of performing, measuring, generating and analysing are performing in respect of each of said plurality of processing stages and said step of adjusting is performed to satisfy a worst case signal processing delay through any of said plurality of processing stages.

17. A method as claimed in claim 1, wherein said processing stage has a plurality of input signals forming an input vector to said processing stage and said steps of measuring, generating and analysing differentiate between different input vector values to identify any correlation between said input vector and said delay values.

18. A method as claimed in claim 1, wherein said steps of measuring and generating are performed by measuring and generating hardware circuits.

19. A method as claimed in claim 1, further comprising storing said delay values in a memory and said step of analysing is performed at least partially by software, said software reading said delay values from said memory.

20. Apparatus for processing data, said apparatus comprising:
at least one processing stage configured to perform data processing;
measuring circuitry, coupled to said at least one processing stage and responsive to signal values output from said at least one processing stage over a period of operation of said apparatus, configured to measure a plurality of instances of a signal processing delay of at least one signal path through said processing stage;

generating circuitry, coupled to said measuring circuitry and responsive to said plurality of instances of said signal processing, configured to generate delay values representing said plurality of instances of said signal processing delay;

analysing circuitry, responsive to said delay values, configured to estimate a worst case signal processing delay through said processing stage; and adjusting circuitry, responsive to said worst case signal processing delay, configured to adjust said one or more operating parameters to provide a timing margin through said processing stage sufficient to satisfy said worst case signal processing delay.

21. Apparatus for processing data, said apparatus comprising:

at least one processing stage means for performing data processing;

measuring means, coupled to said at least one processing stage means and responsive to signal values output from said at least one processing stage means over a period of operation of said apparatus, for measuring a plurality of instances of a signal processing delay of at least one signal path through said processing stage means;

generating means, coupled to said measuring means and responsive to said plurality of instances of said signal processing, for generating delay values representing said plurality of instances of said signal processing delay;

analysing means, responsive to said delay values, for estimating a worst case signal processing delay through said processing stage means; and adjusting means, responsive to said worst case signal processing delay, for adjusting said one or more operating parameters to provide a timing margin through said processing stage means sufficient to satisfy said worst case signal processing delay.

* * * * *